United States Patent [19]

Jenkins

[11] Patent Number: 4,897,253
[45] Date of Patent: Jan. 30, 1990

[54] CATALYTIC GENERATION OF HYDROGEN FROM HYDROCARBONS

[75] Inventor: John W. Jenkins, Reading, England

[73] Assignee: Johnson Matthey Public Limited Company, London, England

[21] Appl. No.: 102,470

[22] Filed: Sep. 29, 1987

[30] Foreign Application Priority Data

Sep. 30, 1986 [GB] United Kingdom ............... 8623482

[51] Int. Cl.$^4$ .............................................. C01B 3/38
[52] U.S. Cl. ................................................... 423/651
[58] Field of Search ......................................... 423/651

[56] References Cited

U.S. PATENT DOCUMENTS

| 3,014,787 | 12/1961 | Peet | 423/651 |
| 3,388,074 | 6/1968 | Reitmeier | 423/651 |
| 3,965,252 | 6/1976 | Kmecak et al. | 423/651 |
| 4,113,836 | 9/1978 | O'Connor | 423/172 |
| 4,115,074 | 9/1978 | Yoshida et al. | |
| 4,301,035 | 11/1981 | Risse | |
| 4,690,690 | 9/1987 | Andrew et al. | |

FOREIGN PATENT DOCUMENTS

| 194067 | 9/1986 | European Pat. Off. |
| 2168503 | 8/1973 | France . |
| 2187887 | 1/1974 | France . |
| 2336346 | 7/1977 | France . |
| 1424382 | 2/1976 | United Kingdom . |
| 2019240 | 10/1979 | United Kingdom . |
| 2053712 | 2/1981 | United Kingdom . |
| 2086255 | 5/1982 | United Kingdom . |
| 8103288 | 11/1981 | World Int. Prop. O. . |

OTHER PUBLICATIONS

Patent Specification WO81/03288.
EPO Search Report dated Dec. 7, 1987.

Primary Examiner—John Doll
Assistant Examiner—Wayner A. Langel
Attorney, Agent, or Firm—Cushman, Darby & Cushman

[57] ABSTRACT

A catalytic process for the generation of hydrogen by the partial oxidation of hydrocarbons, especially alkanes such as methane or hexane. The preferred catalyst system comprises from 0.01 to 5 wt % platinum and from 1 to 15 wt % chromium oxide supported on a refractory solid such as silica. Also a reactor for effecting the process in which the reactants are injected into or among the catalyst system and a technique for starting the process at ambient temperature by introducing an initiating compound such as methanol into the catalyst system.

10 Claims, No Drawings

CATALYTIC GENERATION OF HYDROGEN FROM HYDROCARBONS

This invention relates to the catalytic generation of hydrogen from hydrocarbons, especially alkanes for example naphthas, methane or hexane.

It is known that hydrogen may be catalytically generated by the partial oxidation of methane using a nickel-based catalyst. A difficulty with the use of nickel-based catalysts is that they allow the formation of coke which slowly deactivates the catalyst unless water or steam is injected into the system. Such water or steam addition requires a substantial supply of extra heat which ultimately derives from complete combustion of part of the methane. Therefore, it is desired to provide a catalyst system which is less vulnerable to coking yet which shows high conversion efficiency and high selectivity towards the formation of hydrogen. In patent specification No. WO81/03288 is disclosed a hydrocarbon conversion catalyst composition comprising a catalyst of the noble metal type dispersed on a support material comprising a refractory inorganic oxide together with an active component such as $Cr_2O_3$ such that the catalyst can be regenerated by heating it in an oxygen-containing atmosphere at a temperature in the range 100° to 500° C., followed by a reduction treatment. However, hitherto it has not been possible satisfactorily to effect such catalytic generation of hydrogen from hydrocarbons within a reactor operating at ambient temperature; in particular, if oven temperatures are decreased to ambient temperature, conversion of, for example methane to hydrogen, decreases and hydrogen yield itself decreases.

Furthermore, problems have been found with the lighting off of catalysts using known methods. In particular, it has hitherto not been possible to achieve light off at ambient temperature. Therefore, it is further desired to provide a process for the generation of hydrogen from hydrocarbon which can be started at ambient temperature (for example 0° to 40° C.).

Accordingly, the present invention provides a process suitable for generating hydrogen from hydrocarbons which comprises contacting the hydrocarbon in the presence of oxygen with a catalyst system wherein the contacting is effected by injecting the hydrocarbon into the catalyst system which catalyst system comprises a precious metal and a base metal in elemental or compound form supported on a refractory solid.

The present invention further provides a reactor suitable for effecting the above-described process which reactor comprises an inlet for the hydrocarbon and oxygen, a housing for the catalyst system and an outlet for the hydrogen wherein the inlet penetrates into the housing, thereby allowing the injection of the hydrocarbon and oxygen into or amongst the catalyst system.

We have found that the process and reactor of the present invention overcome the problems of conventional processes and reactors used in the generation of hydrogen from hydrocarbons. In particular, we have found that the present invention enables such generation to be effected at ambient temperature. A surprising result of this invention appears to be the setting up of a hot spot zone or hot zone (which is believed to be approximately spherical in shape) in the catalyst system around the inlet for the reactants (hydrocarbon plus air). The hot spot zone is conducive to exothermic combustion. Adjacent the hot spot zone is a cooler zone conducive to endothermic reactions and further away from the hot spot zone than this, the temperature reduces more quickly. On the contrary, with conventional fixed bed reactors and processes where the reactants are not injected into the catalyst system but simply delivered to the region or housing in which the catalyst system is sited, such a hot spot zone is not initiated and maintained. Instead, there is produced a higher-temperature zone stretching across a section of the catalyst system or housing which section is a fraction of the total length of the catalyst bed. A further surprising feature of the present invention is that heat loss through the walls of the reactor or housing during the process is reduced compared to that observed in conventional fixed bed processes and reactors such as tubular reactors where the reactants are not injected into or in amongst the catalyst system.

The hydrocarbon for use in the partial oxidation process is preferably selected from hydrocarbons having 1-15 carbon atoms such as straight chain alkanes such as methane and hexane; naphthas; and petrol and diesel fuels.

The preferred catalyst system for use in the process and reactor of the present invention comprises from 0.01 to 5 wt% platinum and from 1 to 15 wt% chromium oxide supported on a refractory solid. The weight percentages are based on the total weight of the catalyst system. The preferred amounts of platinum are from 0.1 to 3 wt% such as from 0.25 to 2 wt% for example 1 wt% and the preferred amounts of chromium oxide are from 1 to 5 wt% such as 3 wt%. The support may be a monolithic honeycomb of the type used in purifying the exhausts from motor vehicles or chemical plants or the support may be particulate preferably comprising particles having a maximum dimension of from 1 to 4 mm, for example, 1.5 mm. The preferred support material is silica, but other refractory solids include alumina, magnesia, zirconia, ceria, calcium oxide, silicon carbide and boron nitride.

During operation of the invention, preferably at least part of the catalyst system is at a temperature of at least 400° C. and preferably from 500° to 1200° C., more preferably from 700° to 1000° C. The process is preferably performed by loading the catalyst system into the reactor and injecting into it a mixture of air and methane. Preferably sufficient air is used to ensure that the atomic ratio of oxygen to carbon is from 1 to 3:1.

The preferred gas hourly space velocity (GHSV) is from 50 to 150,000 hour$^{-1}$, preferably from 1,000 to 100,000 hour$^{-1}$, more preferably about 10,000 hour$^{-1}$. For higher hydrocarbons, the GHSV chosen will be towards the lower end of the stated range and vice versa. However, the concept of GHSV in the context of a hot spot zone reactor according to the present invention may not be wholly appropriate because the centre of the action (i.e. the hot spot zone itself) is small in relation to the overall volume of the reactor which is much cooler. Alternatively, the flow rate for the hydrocarbon can be expressed in terms of liters or grammes per hour. For methane (i.e. $C_1$ hydrocarbon), this would be in the range 6 to 15,000 l/hr. Likewise, for hexane (i.e. $C_6$ hydrocarbon), the relevant range would be one sixth that for methane; namely, 1 to 2,500 l/hr or about 4 g/hr to 8.6 kg/hr.

The process can be started by pre-heating part of the catalyst system to a temperature of at least 400° C., for example, 500° C. Alternatively, it has surprisingly been discovered that the process can be started at ambient temperature by introducing an initiating compound more easily oxidisable than the hydrocarbon into the hydrocarbon contacting or to be injected into the catalyst system. Accordingly this invention further provides a preferred process for the catalytic generation of hydrogen from hydrocarbon in which hydrocarbon is injected in the presence of oxygen into a catalyst system comprising from 0.01 to 5 wt% platinum and from 1 to 15 wt% of chromium oxide supported on a refractory solid wherein, in order to enable the process to start at ambient temperature, a compound which is exothermically oxidisable by the catalyst system at ambient temperature is also contacted with the catalyst system in sufficient amounts and for a sufficient period of time to cause the temperature of part of the catalyst system to reach at least 500° C.

The more easily oxidisable or initiating compound is usually an aliphatic alcohol preferably comprising 1 to 6 carbon atoms and more preferably is methanol. Preferably methanol is introduced at a rate of 3 to 20 g/hour such as 6 g/hour and it is usually sufficient to inject over a period of from 0.5 to 3 minutes such as 1 minute. Another initiating compound is hydrogen, the source of which might conveniently be the product of a hydrogen generating reaction according to the present invention. Preferably, pure hydrogen is used or a gas containing above 40 vol.% hydrogen.

EXAMPLE 1

"Hot spot zone" reactor

A reactor suitable for use in the performance of this invention will now be described with reference to the accompanying drawing which shows the reactor in longitudinal section.

The drawing shows a reactor 1 composed of a stainless steel tube 2 which is 89 mm long and 51 mm in diameter. Tube 2 is closed by flanges 3 and 4 (which together comprise a housing 11 for the catalyst system) through which inlet and outlet pipes 5 and 6 pass. The housing 11 of reactor 1 is filled with a particulate catalyst system 7 and inlet pipe 5 penetrates 38 mm down into catalyst system 7. In order to monitor the temperature of the catalyst system 7, a thermocouple 8 is provided 12.7 mm below end 5a of inlet pipe 5. A supply pipe 9 for an initiating compound such as methanol communicates with inlet pipe 5.

In operation, a mixture of hydrocarbon and air is passed into the housing 11 of reactor 1 via inlet pipe 5. In this way, the reactants are injected into or in amongst the catalyst system. To start the partial oxidation of the hydrocarbon, a small quantity of methanol is injected from pipe 9 into the mixture in pipe 5 whereupon oxidation of the methanol begins at end 5a of pipe 5. The heat generated by the oxidation of the methanol raises the temperature of catalyst system 7 to a temperature at which partial oxidation of the hydrocarbon starts. When this happens, the supply of methanol is terminated and it is found that the partial oxidation of methane is self-sustaining in a hot spot zone 10 around end 5a of inlet pipe 5. The products of the partial oxidation leave reactor 1 via outlet pipe 6.

Of course, it will be understood that reactors having other dimensions or configurations can fall within the scope of the present invention, of which the above-described reactor is for illustration only. The invention is further illustrated by the following Examples.

EXAMPLES 2 TO 4

(a) Preparation of the Catalyst System

Spherical silica granules having a diameter of 1.5 mm and available under the name Shell S980B were provided with a deposit of chromium oxide using the so-called "incipient wetness technique". In this technique, the granules were mixed with a volume of aqueous chromic acid which is just sufficient to be fully absorbed by the granules. The granules and absorbed oxide were then dried at 110° C. The incipient wetness technique was then used to provide a deposit of platinum by adding the dried granules to a volume of a solution of platinum ions which was just sufficient to be fully absorbed by the granules. The solution comprised platinum tetrammine hydroxide ($Pt(NH_3)_4(OH)_2$) dissolved in ammonia solution (5% volume). The granules were then dried. It is believed that the platinum ions may react with the chromic acid to form a chromate.

The concentrations of platinum moiety and chromium moiety present in the aqueous solutions absorbed into the granules is such as to produce a catalyst system containing the amounts of platinum specified in Table 1 and 3% chromium in each case.

EXAMPLES 2 TO 4

(b) Performance of the process using methane 65 g of a catalyst system made according to Example (a) were loaded into the reactor shown in the drawing. The catalyst system contained 3.0 wt% chromium and various amounts of platinum as shown in Table 1. Methane was passed through the catalyst at a rate of 9.7 l/hr (i.e. an 'apparent' GHSV of 100 hour$^{-1}$) and it was mixed with various amounts of air to produce the oxygen to methane ratios shown in Table 1.

Methanol was injected into the mixture of air and methane at a rate of 6 g methanol per hour. Injection was continued for one minute by which time a self-sustaining partial oxidation of the methane had been established in a hot spot zone around the end of

TABLE 1

| Example | Molar Ratio of Oxygen to Methane (atomic ratio in brackets) | Temperature of Hot Spot °C. | % Methane Converted | Yield of Hydrogen per 100 moles of Methane Charged (in moles) | Selectivity in moles Hydrogen generated per 100 moles Methane Converted (theoretical maximum = 200) |
|---|---|---|---|---|---|
| 2 | 0.74 (1.48) | 721 | 50 | 40 | 81 |
|  | 0.82 (1.64) | 746 | 56 | 49 | 87 |
| 0.1 wt % Pt | 0.90 (1.80) | 776 | 63 | 66 | 104 |
|  | 0.98 (1.96) | 800 | 70 | 80 | 114 |
|  | 1.05 (2.10) | — | — | — | — |
| 3 | 0.74 (1.48) | 718 | 58 | 78 | 135 |
|  | 0.82 (1.64) | 744 | 66 | 93 | 141 |
| 0.2 wt % Pt | 0.90 (1.80) | 764 | 77 | 119 | 153 |
|  | 0.98 (1.96) | 783 | 84 | 133 | 157 |
|  | 1.05 (2.10) | 840 | 89 | 147 | 165 |
| 4 | 0.74 (1.48) | 620 | 61 | 95 | 155 |

TABLE 1-continued

| Example | Molar Ratio of Oxygen to Methane (atomic ratio in brackets) | Temperature of Hot Spot °C. | % Methane Converted | Yield of Hydrogen per 100 moles of Methane Charged (in moles) | Selectivity in moles Hydrogen generated per 100 moles Methane Converted (theoretical maximum = 200) |
|---|---|---|---|---|---|
| 1.0 wt % Pt | 0.82 (1.64) | 650 | 69 | 111 | 162 |
|  | 0.90 (1.80) | 680 | 81 | 135 | 167 |
|  | 0.98 (1.96) | 712 | 91 | 161 | 178 |
| 5 | 1.05 (2.10) | 760 | 94 | 160 | 171 |
|  | 0.74 (1.48) | — | — | — | — |
| 1.0 wt % Pd | 0.82 (1.64) | 691 | 57 | 60 | 105 |
|  | 0.90 (1.80) | 729 | 64 | 64 | 101 |
|  | 0.98 (1.96) | 760 | 66 | 66 | 95 |
| 6 | 1.05 (2.10) | — | — | — | — |
|  | 0.74 (1.48) | — | — | — | — |
| 1.0 wt % Ni | 0.82 (1.64) | 672 | 58 | 57 | 98 |
|  | 0.90 (1.80) | 698 | 65 | 76 | 117 |
|  | 0.98 (1.96) | 710 | 71 | 88 | 124 |
|  | 1.05 (2.10) | 702 | 78 | 101 | 130 | the inlet pipe. The temperature of the catalyst system as measured by the thermocouple when the partial oxidation was fully established is shown in Table 1 together with the yield of hydrogen achieved and the selectivity to hydrogen generation of the partial oxidation. It will be seen from Table 1 that increasing the platinum content of the catalyst system favours increased yield, improved selectivity and lower operating temperatures.

EXAMPLES 5 AND 6

The procedure of Example 4 was repeated except that platinum was replaced by palladium or nickel in the catalyst system. Palladium or nickel were introduced into the catalyst system by the incipient wetness technique using palladium nitrate or nickel nitrate respectively. The results obtained are shown in Table 1 from which it can be seen that both catalyst systems produced results inferior to that of platinum.

EXAMPLES A AND B

Comparison with Tubular Reactor

The procedure of Example 4 was repeated except that, instead of using a hot spot zone reactor according to the present invention, a conventional tubular reactor of the type where the reactants are simply delivered to the region or housing in which the catalyst system is sited (rather than injected into the catalyst system) was used. In Example A, the GHSV in the tubular reactor was adjusted (to 42,500 hour$^{-1}$) to allow for comparison between the performance of the two reactors/processes at a similar O:C ratio and methane conversion. In Example B, substantially similar GHSVs were used in each reactor (3,400 hour$^{-1}$ for the hot spot zone reactor and 1,370 hour$^{-1}$ for the conventional tubular reactor). In each case, it can be seen from Table 2 that the hot spot zone reactor and process of the present invention is superior to the hitherto-known reactor and process in terms of methane conversion, yield and selectivity. This is even true of Example B where, in this case, the catalyst system is apparently working harder.

EXAMPLES 7 AND 8

Performance of the process using hexane

The procedure of Examples 2 to 4 was repeated except that in all cases n-hexane was used instead of methane. The catalyst system contained 1 wt% of platinum, 12 g of catalyst system located in the immediate vicinity of the end 5a of pipe 5 was used and the hexane flow rate was as shown in Table 3. The results obtained are shown in Table 3. From Table 3 can be seen that the higher flow rate produced a better yield and selectivity, as does a higher $O_2$:hexane ratio.

TABLE 2

| Example | Molar Ratio of Oxygen to Methane (atomic ratio in brackets) | Temperature of Hot Spot °C. | % Methane Converted | Yield of Hydrogen per 100 moles of Methane Charged (in moles) | Selectivity in moles Hydrogen generated per 100 moles Methane Converted (theoretical maximum = 200) |
|---|---|---|---|---|---|
| A |  |  |  |  |  |
| Hot Spot zone reactor | 1.05 (2.10) | 760 | 94 | 160 | 171 |
| Tubular reactor | 1.07 (2.14) | 421 | 95 | 134 | 141 |
| B |  |  |  |  |  |
| Hot Spot zone reactor | 0.98 (1.96) | — | 93.4 | 146 | 156 |
| Tubular reactor | 1.07 (2.14) | — | 72 | 76 | 106 |

TABLE 3

| Example and gas flow rate | Molar Ratio of Oxygen to Hexane (Atomic ratio in brackets) | Temperature of Hot Spot °C. | % Hexane Converted | Yield of Hydrogen per 100 moles of Hexane Charged (moles) | Selectivity in moles Hydrogen generated per 100 moles Hexane Converted (Theoretical maximum = 700) |
|---|---|---|---|---|---|
| 7 | 4 (1.33) | 742 | 58 | 194 | 334 |

TABLE 3-continued

| Example and gas flow rate | Molar Ratio of Oxygen to Hexane (Atomic ratio in brackets) | Temperature of Hot Spot °C. | % Hexane Converted | Yield of Hydrogen per 100 moles of Hexane Charged (moles) | Selectivity in moles Hydrogen generated per 100 moles Hexane Converted (Theoretical maximum = 700) |
|---|---|---|---|---|---|
| | 5 (1.67) | 799 | 81 | 362 | 448 |
| 6.25 g/ | 6 (2.0) | 847 | 98 | 479 | 485 |
| Hexane hr. | 7 (2.33) | 966 | 100 | 485 | 485 |
| 8 | 2 (0.67) | 720 | 31 | 115 | 370 |
| 12.5 g/hr | 3 (1.0) | 811 | 55 | 330 | 595 |
| Hexane | 4 (1.33) | 925 | 77 | 462 | 606 |

EXAMPLE 9

Light-off using hydrogen gas

The procedure of Example 4 was substantially followed, substituting the following conditions:

Catalyst volume 5.3 cm$^3$; $O_2$:$CH_4$=0.83 (O:C=1.66); flow rates: air=30 l/hr; methane=6 l/hr ('apparent' GHSV=6790 hour$^{-1}$).

However, instead of using methanol as the initiating compound, hydrogen was injected at a flow rate of 12 l/hr.

It was found that, in this way, the catalyst litoff from ambient temperature and after a few minutes it reached 200° C. At this point, injection of hydrogen was discontinued and methane injection was started. Over a 3 hour period, $O_2$ conversion was 95% and methane conversion 77%, producing a gas containing 20 vol.% $H_2$ and 3 vol.% CO.

I claim:

1. A process for generating hydrogen by the partial oxidation of a hydrocarbon, which process does not require the application of external heat for the process to proceed, and which comprises injecting into at least one point amongst a mass of a catalyst consisting essentially of platinum and chromium oxide supported on a refractory solid catalyst support, a mixture comprising a hydrocarbon and oxygen, the point of injection having a local temperature of from 700° to 1000° C. the hydrocarbon reacting with the oxygen to generate said hydrogen.

2. A process as claimed in claim 1, wherein the catalyst contains from 0.01 to 5 wt% platinum based on the total weight of the catalyst.

3. A process as claimed in claim 1, wherein the catalyst contains from 1 to 15 wt% chromium based on the total weight of the catalyst.

4. A process as claimed in claim 1, wherein the refractory solid is silica.

5. A process as claimed in claim 1, wherein the hydrocarbon has from 1 to 15 carbon atoms.

6. A process as claimed in claim 5, wherein the hydrocarbon is selected from $C_1$ to $C_6$ alkanes, naphthas, and petrol and diesel fuels.

7. A process as claimed in claim 1, which is initiated without the application of external heat by introducing an initiating compound more easily oxidizable than the hydrocarbon into the catalyst.

8. A process as claimed in claim 7, wherein the initiating compound is selected from methanol and hydrogen.

9. A process as claimed in claim 2, wherein the catalyst contains from 0.25 to 2 wt% platinum based on the total weight of the catalyst.

10. A process as claimed in claim 7 which is conducted without the application of external heat.

* * * * *